United States Patent

Webster

[11] 3,885,534
[45] May 27, 1975

[54] ELECTRONIC ADVANCE AND RETARD CONTROL CIRCUIT

[75] Inventor: John Lyman Webster, Huntsville, Ala.

[73] Assignee: Chrysler Corporation, Highland Park, Mich.

[22] Filed: Aug. 15, 1973

[21] Appl. No.: 388,673

[52] U.S. Cl. .......................... 123/117 R; 123/148 E
[51] Int. Cl. .............................................. F02p 5/04
[58] Field of Search ...... 123/148 E, 117 R; 307/269

[56] References Cited
UNITED STATES PATENTS
3,592,178  10/1969  Schiff ................................ 123/148
3,660,689  5/1972  Oishi et al ........................... 307/269
3,738,339  6/1973  Huntzinger et al. ................. 123/117

Primary Examiner—Manuel A. Antonakas
Assistant Examiner—James W. Cranson
Attorney, Agent, or Firm—Talburtt & Baldwin

[57] ABSTRACT

A feedback regulated electronic shaft angle and rate measuring circuit for use in an electronic spark timing angle advance and retard controller for an internal combustion engine ignition system.

10 Claims, 2 Drawing Figures

3,885,534

ELECTRONIC ADVANCE AND RETARD CONTROL CIRCUIT

FIELD OF THE INVENTION

This invention relates to electronic spark timing controllers for controlling the degree of spark advance or retardation of the firing event in internal combustion engines and, more particularly, to an electronic shaft angle and rate measuring circuit for use in such spark timing angle controllers.

BACKGROUND OF THE INVENTION

Such spark timing advance and retard controllers are described in copending U.S. Pat. applications Ser. No. 322,243 and Ser. No. 322,577 filed Jan. 9, 1973 and of common ownership herewith.

These systems depend for their operation on the development of an engine position waveform signal, which is compared with desired timing angle signal derived from one or more timing advance and/or retard sources in accordance with selected engine operating parameters to produce a spark timing angle signal. The latter signal is applied to an electronic ignition control unit to produce in the engine cylinders a firing event whose occurrence in time is automatically and electronically varied in accordance with selected indicia of engine operation.

The engine position signal is a voltage ramp which represents the instantaneous angular position of the engine crankshaft and is independent of engine speed. The voltage ramp is produced by a magnetic pickup, which generates a series of pulses of bipolar or alternating waveform that are processed in several pulse-shaping stages, which may include Schmitt trigger and univibrator circuits, to produce a train of constant width pulses of a repetition rate proportional to engine speed. The shaped pulses are then rectified in a pulse averaging circuit to produce an engine speed signal. The engine speed signal is then applied to an integrator, which is periodically reset from the pickup pulses to produce the engine position signal.

The derivation of the speed signal by pulse shaping and averaging techniques increases the system complexity and produces an undesirable ripple component therein which affects the engine position signal and can be a source of timing variation in a close tolerance system.

Accordingly, the present invention seeks to provide a shaft angle and rate measuring circuit for use in electronic spark timing advance and retard controllers of the above and a related character in which an accurate and ripple free engine speed signal and an engine angular position signal are developed in a simple efficient manner without the use of pulse shaping and averaging circuits.

Other objects are to provide a circuit of the above character in which the aforesaid signals are automatically and continuously regulated to be proportioned to the actual engine shaft angle position and shaft velocity and are relatively insensitive to supply voltage variations.

SUMMARY OF INVENTION

In accordance with the invention there is provided an electronic shaft angle and rate measuring or signal producing circuit for apparatus of the described character. Notably, the circuit includes an adjustable controllable current source whose output is integrated by a capacitor, which is completely discharged every $4\pi/C$ radians of engine crankshaft rotation, where C is the number of engine cylinders. The output of the integrator is compared in an error comparator against a fixed reference voltage of a level which the integrator output voltage should attain when the capacitor is discharged. The comparator automatically adjusts the output of the current source to a lower or a higher value if the integrator output voltage falls below or rises above the fixed reference level. Thus, the output of the current source is automatically and continuously regulated to be proportional to shaft angular velocity so that the output of the integrator will be proportional to the angular position of the shaft.

The organization and operation of the invention will be understood from the detailed description of a preferred embodiment of the invention made with reference to and following the accompanying drawings described below.

DESCRIPTION OF THE PREFERRED EMBODIMENT

Figure 1:
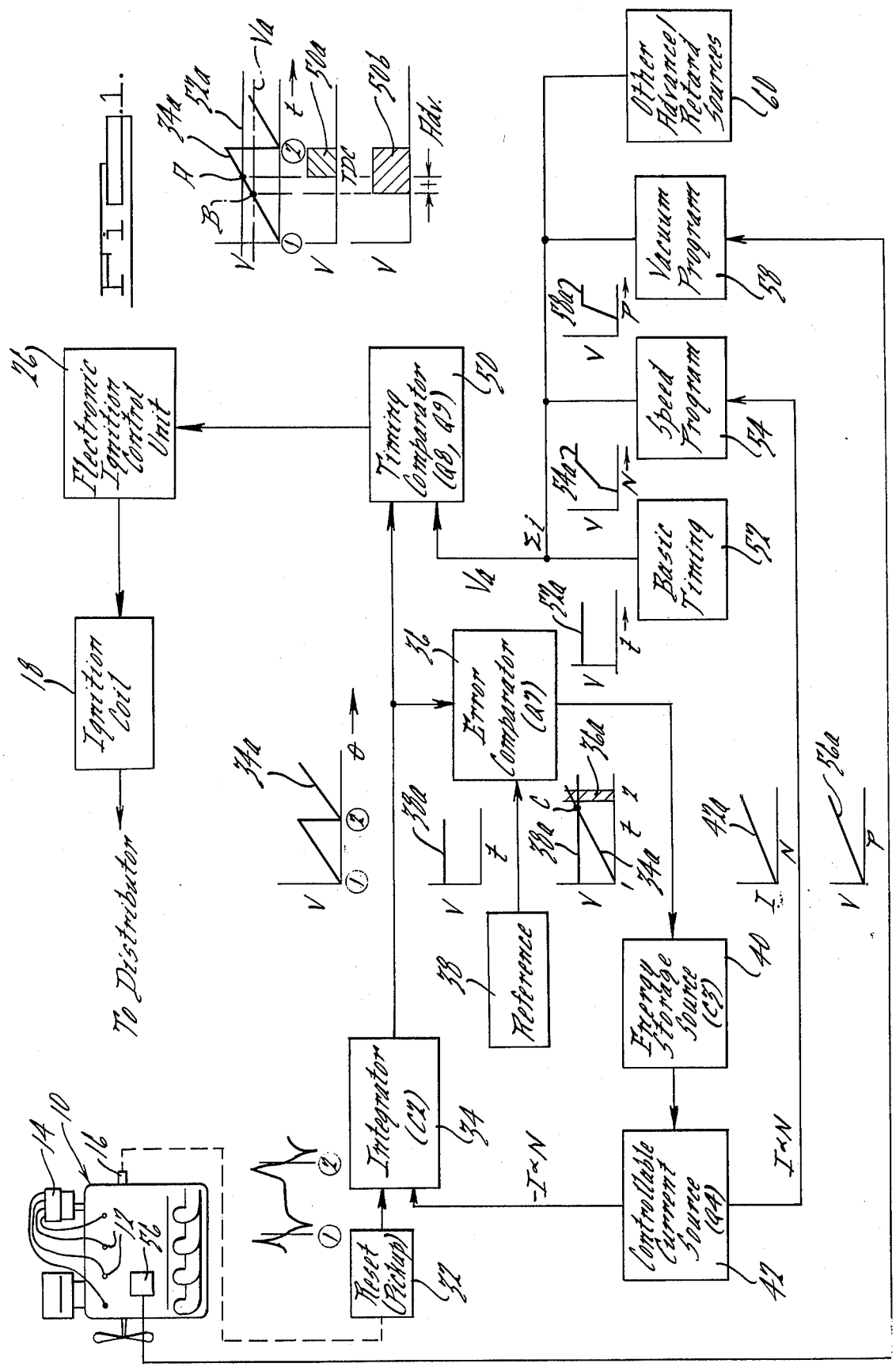
FIG. 1 is a functional block diagram of an electronic spark timing angle controller incorporating an electronic shaft angle and rate measuring apparatus in accordance with the present invention.

In FIG. 1, the numeral 10 represents a four-cycle internal combustion engine having a plurality of sparking devices 12 and a distributor 14 which is driven from the engine camshaft 16 for supplying high tension, energy from the ignition coil represented at 18 to the sparking devices 12, one of which is provided for each engine cylinder.

Figure 2:
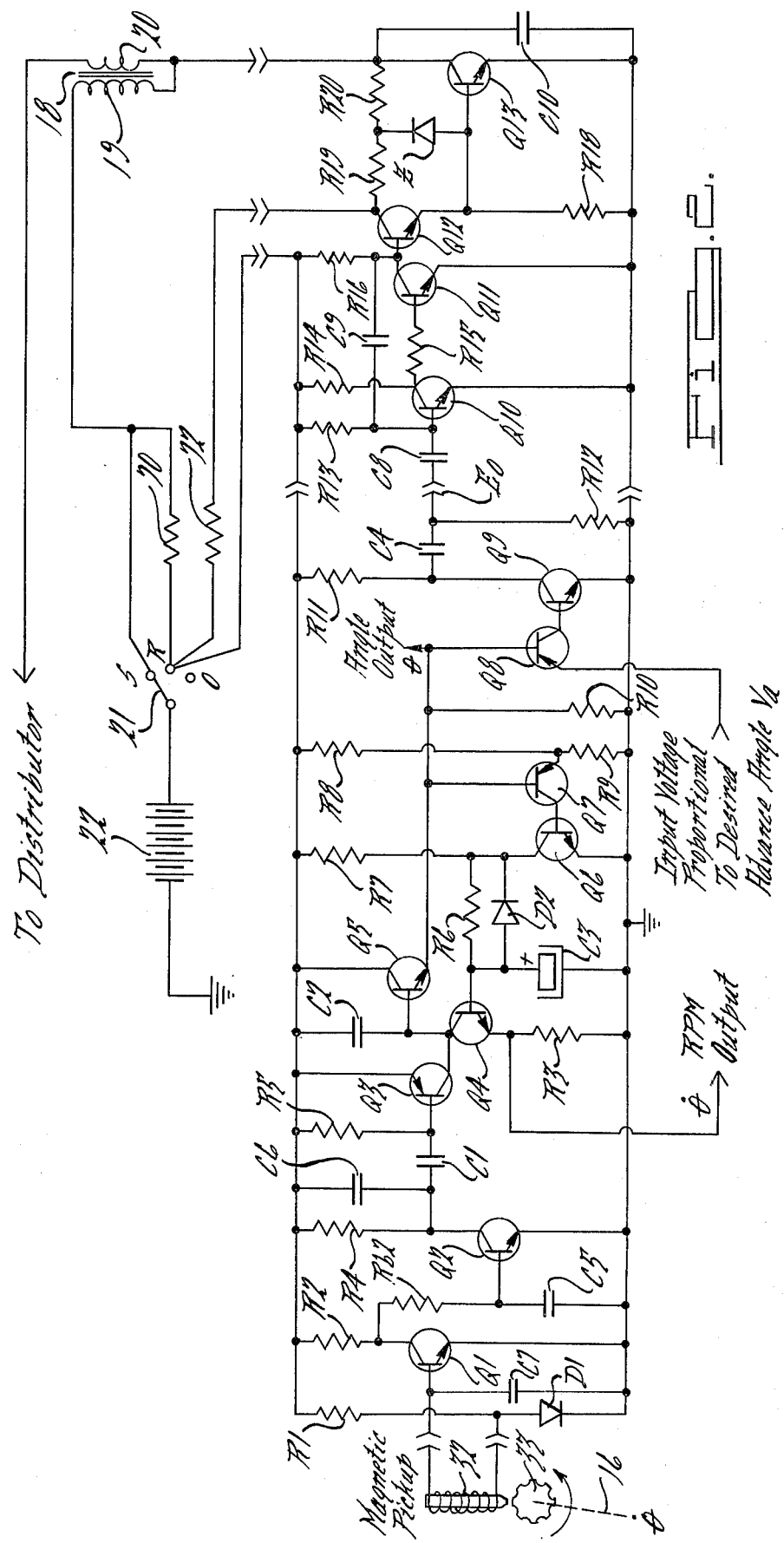
FIG. 2 is an electrical schematic circuit diagram for implementing the system of FIG. 1.

The primary winding 19 of the ignition coil is shown in FIG. 2 connected through the vehicle ignition switch 21 for energization from an electrical potential source 22. As further shown in FIG. 1, the energization of the ignition coil is under the control of an electronic control unit 26, which generates ignition trigger signals from an applied input signal whose occurrence in time or angular position relationship to a predetermined angular position of the engine crankshaft is varied in accordance with the electronic spark timing angle controller comprised of the remaining components of FIG. 1.

The shaft angle and rate measuring circuit of the present invention comprises a pickup reset component 32, an integrator 34, an error comparator 36, a reference signal source 38, an energy storage source 40 and a controllable current source 42. In accordance with the invention, source 42 produces a current whose amplitude is continuously sensed and regulated by the components 32–40 in a closed loop proportional error feedback system to be proportional to the instantaneous engine speed or crankshaft velocity, as will be more fully described later herein.

The output of the current source 42 is applied to the integrator 34 to develop a ramp signal voltage which is shown at 34a and is reset to zero by the synchronous reset component 32 every $4\pi/C$ radians of engine crankshaft rotation, where C is equal to the number of cylinders of the engine 10. It will be understood that the engine position signal 34a is independent of engine speed and should attain the same peak value at the end of each reset interval. In the case of an eight-cylinder engine, the reset interval will be $\pi/2$ radians or 90 degrees of crankshaft rotation or 45° of camshaft rotation at half of crankshaft speed.

The engine position signal 34a is applied to one of the two inputs of a second amplitude comparator device 50, herein called the timing comparator 50, the other input of which is shown as receiving another reference level signal 52a from a source 52 for establishing the basic or initial timing of the system. The output of the basic timing source 52 is a d.c. signal whose amplitude is preset to a level equal or proportional to an instantaneous amplitude level of the position signal corresponding to a predetermined angular position of the engine relative to the start of the ramp signal established by the mechanical angular position of the pickup 32 relative to the engine crankshaft. Thus, the pickup, which may be mounted within the housing of the distributor 14, may be mechanically oriented relative to the camshaft driven distributor rotor shaft to cause the ramp position signal to start at say 70° BTC and to be reset 20° ATC by a subsequent pulse produced by the pickup. The level of the basic timing signal 52a can then be selected so that the comparator 50 will produce a signal output pulse 50a at the top dead center or TDC position of a piston in an engine cylinder as shown at point A where the engine position signal 34a attains the amplitude of the basic timing establishing signal 52a in the waveform comparison relationship in FIG. 1. It will be understood that the comparator 50 is an amplitude comparator device which produces an output whenever and while the amplitude of a selected one of the inputs thereto attains and exceeds the level of the signal applied to its other input.

The output of the timing comparator 50 is applied to the electronic ignition control unit 26 to interrupt the energization of the primary winding 19 of the ignition coil 18 and to induce a burst of high tension energy in the secondary winding 20 for the engine spark plugs at a time related to the aforesaid position of a piston in an engine cylinder selected for firing by the distributor.

For proper operation of the engine, the spark timing in the engine cylinders must be varied in accordance with various engine operating parameters, including engine speed and load as manifested by engine vacuum. Towards this end, a voltage signal derived from the engine speed related output 42a of the current source 42 is applied to a speed program device 54, which produces a segmented or multiple sloped form of volts v. speed transfer characteristic 54a corresponding to the recognized form of engine governor advance characteristic for an internal combustion engine, as discussed more fully in the aforementioned applications referenced herein. In addition, a vacuum related voltage signal 56a derived from an engine vacuum responsive pressure transducer 56 is applied to a vacuum program device 58, which produces a double-sloped form of volts v. vacuum transfer characteristic corresponding to the recognized form of engine vacuum advance characteristic.

The output of the speed program schedule device 54 and of the vacuum program schedule device 58 are shown as applied to an algebraic summing junction indicated at $\Sigma j$ with the basic timing source signal 52a to affect the level of the latter signal by shifting it up or down as shown by the dashed and dotted signal level Va and thus advance the timing of the output pulse 50b produced by the comparator as shown at point B in the timing waveform comparison in FIG. 1.

Other advance and/or retard sources, represented at 60 in FIG. 1, may also be applied to the summing junction or comparison input terminal of the comparator viewed as a summing comparator to further affect the resultant level of the desired timing angle signal Va and advance or retard the ignition triggering output pulse from the comparator 50.

Turning now to the theory of operation of the shaft angle and rate measuring circuit of the invention, the engine position signal is developed from the variable current source 42 whose output, represented at 42a, is assumed to be proportional to shaft velocity $\omega$ or engine speed N, where $\omega = d\theta/dt$, and would be a single value function at a given speed. This current is integrated into a ramp voltage $V_\theta$ proportional to shaft angle $\theta$ by charging a capacitor whose voltage is reset to zero every 90° of crankshaft or 45° of camshaft rotation of an eight-cylinder engine. If the voltage is to be proportional to shaft angle, then it should reach the same magnitude each time it is reset at the end of each recurring cycle thereof. If it does not, the current source 42, which may be viewed as a current pump, is automatically adjusted in a closed-loop feedback fashion to correct the output level of the current source in an increasing or decreasing manner so that the shaft position signal 34a will attain the same predetermined magnitude every $4\pi/C$ radians of engine rotation.

This corrective action is accomplished in accordance with the present invention by the error comparator 36, which compares the engine position signal 34a with a reference signal 38a from source 38 whose output is preset to a predetermined level corresponding to the level which the engine position signal 34a should attain at the time or point when it is reset every 90° of engine rotation for the aforementioned engine. If the peak or magnitude of the ramp signal exceeds the reference signal 38a as shown at point C in the engine position peak signal comparison in FIG. 1, the error comparator 36 produces an error correcting signal during the time the ramp signal exceeds or differs from the reference signal as shown by the shaded region 36a in the illustrated waveform comparison of the ramp and reference signals 34a and 38a in FIG. 1. The detected error signal is then applied to an energy storage source 40, which comprises a charged storage capacitor and is controlling the current source 42, to discharge the source 40 and adjust the output of the current source until the peak of the ramp signal coincides with the reference signal 38a.

If the peak or magnitude of the ramp signal falls below and does not reach the level of the reference signal 38a when the ramp signal is reset at 90°, the capacitor in the energy storage source 40 is caused to charge to a higher level until the output of the integrator 34 does reach the reference level. When this closed-loop action has corrected the current source 42, the output of the current source will be directly proportional to shaft velocity $\omega$ and the integrator voltage output will be directly proportional to shaft angle.

Circuit Description

Referring to the schematic diagram of FIG. 2, the input for the illustrated circuit is derived from a magnetic pickup 32 excited by an eight-lobe cam 33 mounted on the distributor rotor shaft 15 so that a pulse is received every 45 degrees of distributor shaft rotation. Diode $D_1$ and resistor $R_1$ forward bias NPN transistor $Q_1$ through the magnetic pickup to compensate for the base emitter voltage drop of $Q_1$. The input pulse is a double polarity pulse, the negative going portion of which cuts off the conduction of transistor $Q_1$ allowing its collector voltage to go positive. This turns on NPN transistor $Q_2$, causing its collector voltage to go negative. This negative pulse is coupled to a PNP transistor $Q_3$ causing it to conduct and discharge $C_2$, the integrating capacitor.

NPN transistor $Q_4$ is an emitter follower and constitutes the controllable variable current source 42. Its collector current is proportional to the voltage on $C_3$, the storage capacitor of the energy storage source 40. The voltage across $R_3$, the emitter resistor of transistor $Q_4$, is proportional to RPM. Transistor $Q_5$ is a very high beta NPN transistor used as an emitter follower to prevent loading of the integrating capacitor.

Capacitors $C_5$, $C_6$ and $C_7$ are used to provide immunity from electrical noise induced on the magnetic pickup by ignition coil pulses.

Resistors $R_8$ and $R_9$ establish the reference voltage 38a to which the integration is compared by the comparator 36 comprising transistors $Q_6$ and $Q_7$. Transistor $Q_7$ conducts only if the integrator 34 has integrated below the reference voltage established by voltage dividing resistors $R_8$ and $R_9$. If transistor $Q_7$ does conduct, it conducts for a time proportional to the error in integration and turns on transistor $Q_6$, which rapidly discharges energy from storage capacitor $C_3$ through diode D2.

If transistors $Q_7$ and $Q_6$ do not conduct, the integration never reached the reference voltage 38a so the storage capacitor $C_3$ is allowed to charge to a higher value through resistors $R_6$ and $R_7$. This increases the current output of transistor $Q_4$ and causes capacitor $C_2$ to be integrated more rapidly on successive cycles until it eventually does in fact integrate to the desired reference voltage just prior to being reset.

Thus, the closed-loop action regulates the integrator output voltage peak or reset amplitude so that it always equates to 45 distributor °. Therefore, the voltage of the sawtooth waveform seen at the output of the integrator 34 is at any instant proportional to shaft angle regardless of the rate. Furthermore, the voltage across resistor $R_3$ is automatically regulated to be proportional to shaft RPM.

Transistors $Q_8$ and $Q_9$ form the timing comparator 50, which compares the shaft angle voltage 34a with an input voltage $V_A$ proportional to the desired advance angle. When the shaft angle reaches the desired advance angle, transistor $Q_9$ conducts causing a negative pulse to be coupled through capacitor $C_4$ and resistor $R_{12}$ to the output $E_o$ of the electronic advance and retard control circuit.

It will be noted that the circuit is relatively insensitive to voltage variations because the reference voltage 38a changes in the same proportion so no timing error results from this cause.

The aforementioned negative-going output voltage is applied to the electronic ignition system shown as comprising capacitors C8–C10, resistors R13–R20 and transistors Q10–Q13.

In the ignition unit, NPN transistor Q10 is biased on by means of resistors R13 and R14. NPN transistor Q11 has its base interconnected with the collector of transistor Q10 by resistor R15. Accordingly, transistor Q11 is turned on as transistor Q10 is turned off by the negative-going pulse applied thereto from capacitor C4. The ignition circuit, including transistor Q11 operates as a monostable or one-shot circuit by means of the capacitive coupling C9 which is connected between the collector of transistor Q11 and the base of transistor Q10 and provides an RC time constant and positive feedback latch in conjunction with resistors R16 and R13.

The collector electrode of transistor Q11 is directly connected to the base electrode of NPN transistor Q12, the collector of which is connected through a resistor R16 to B+. The emitter electrode of transistor Q12 is connected to ground through resistor R18 and also the input of NPN output transistor Q13. Limitation of the current and voltage applicable across the primary electrodes of transistor Q13 is accomplished by means of a Zener diode Z, which is connected across the transistor terminals as shown. It will be appreciated that as transistor Q11 turns on, transistors Q12 and Q13 turn off. A capacitor C10 is connected across the primary electrodes of Q39.

The collector electrode of transistor Q13 is connected in series with the primary winding 19 of the ignition coil 18 and ballast resistor 70, which is connected to the vehicle storage battery 22 through the run contact of the vehicle ignition switch 21 as indicated. Primary coil winding 19 is magnetically coupled with the ignition secondary coil 20, which is interconnected directly with the high voltage distribution element of the distributor 14 by which the high voltage ignition pulses are sequentially applied to the spark igniting devices or spark plugs 12 of the engine.

What is claimed is:

1. In an internal combustion engine with a closed loop, regulated shaft angle position signal and shaft angular velocity signal generating system, comprising in combination an adjustable current source, integrating means having an input connected to said adjustable current source, reset means responsive to engine rotation periodically resetting said integrating means at regular spaced intervals of engine rotation to produce a sawtooth-shaped signal related to engine shaft angle position in the output of said integrating means, a voltage reference source establishing the regulation level for said sawtooth signal and having a predetermined relationship to the peak amplitude which the sawtooth signal should attain when said integrating means is reset by said reset means, comparator means connected to said reference source and said integrating means to produce an output signal when the amplitude of said sawtooth signal attains said predetermined relationship to the level of said voltage reference source, and means connecting the output of said comparator means to said adjustable current source for adjusting the latter until the output of said integrating means attains said predetermined relationship to the voltage level of said reference source when the integrator means is reset, said integrating means, comparator means and said adjustable current source connected in a closed feedback loop which automatically and continuously regulates the sawtooth-shaped shaft angle position signal in the output of said integrating means and produces the shaft angular velocity signal in the output of the adjustable current source as a result of the regulation of the shaft angle position signal in the output of said integrating means.

2. A system in accordance with claim 1, wherein said predetermined relationship between the output of said integrating means and the voltage level of said reference source is one of equality.

3. In an internal combustion engine, a timing signal generating and controller system comprising an adjustable current source, integrating means having an input connected to said current source, reset means responsive to engine rotation periodically resetting said integrating means at regularly spaced intervals of engine rotation, a voltage reference source, first comparator means connected to said reference source and said integrating means to produce an output from the comparator means when the output of said integrating means attains a predetermined relationship to the voltage level of said reference source, means connecting the output of said first comparator means to said current source for adjusting said current source until the output of said integrating means attains said predetermined relationship to the level of said reference source when the integrating means is reset, a second comparator means having a pair of inputs respectively connected to receive the output of said integrating means and of said adjustable current source, and utilization means connected to receive the output of said second comparator means to control an operation of the engine.

4. A system in accordance with claim 3 wherein said integrating means is reset every $4\pi/C$ radians of engine revolution, where C is the number of engine cylinders.

5. A system in accordance with claim 3 wherein said reset means includes a magnetic pickup driven in synchronism by said engine.

6. A system in accordance with claim 3 wherein said current source adjusting means includes an energy storage device whose stored energy content is automatically changed to adjust the output of said current source if the output of said integrating means is of a different magnitude from said voltage reference source when the integrating means is reset.

7. Apparatus in accordance with claim 4 wherein said energy storage device is of a capacitive nature whose stage of charge is adjusted by said comparator means to adjust the output of said current source and render the output of said integrating means equal to the reference source when the integrating means is reset.

8. A system in accordance with claim 3 wherein said utilization means is an electronic ignition control unit controlling the energization of the ignition coil of said engine.

9. A system in accordance with claim 3 wherein said spark timing angle controller includes a source of potential and wherein said reference source and said adjustable current source are both derived from said potential source.

10. A system in accordance with claim 3 where in said predetermined relationship between the output of said integrating means and the voltage level of said reference source is one of equality.

* * * * *